(12) United States Patent
Li

(10) Patent No.: US 10,199,857 B2
(45) Date of Patent: Feb. 5, 2019

(54) TRANSFORMER CIRCUIT AND METHOD OF REDUCING IDLING POWER CONSUMPTION

(71) Applicant: Shenzhen China Star Optoelectronics Technology Co., Ltd., Shenzhen, Guangdong (CN)

(72) Inventor: Wendong Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 9 days.

(21) Appl. No.: 15/552,744

(22) PCT Filed: Apr. 28, 2017

(86) PCT No.: PCT/CN2017/082631
§ 371 (c)(1),
(2) Date: Aug. 22, 2017

(87) PCT Pub. No.: WO2018/188132
PCT Pub. Date: Oct. 18, 2018

(65) Prior Publication Data
US 2018/0294668 A1  Oct. 11, 2018

(51) Int. Cl.
| | | |
|---|---|---|
| *H03K 17/687* | (2006.01) |
| *H02J 9/00* | (2006.01) |
| *H01F 27/24* | (2006.01) |
| *H01F 27/29* | (2006.01) |
| *H02M 3/156* | (2006.01) |
| *H02M 3/335* | (2006.01) |
| *H02M 5/12* | (2006.01) |

(52) U.S. Cl.
CPC ............ *H02J 9/005* (2013.01); *G06F 1/3296* (2013.01); *H01F 27/24* (2013.01); *H01F 27/29* (2013.01); *H02M 3/156* (2013.01); *H02M 3/33523* (2013.01); *H02M 5/12* (2013.01)

(58) Field of Classification Search
CPC .............................. H02J 9/005; H03K 17/687
USPC .................................................. 327/333, 544
See application file for complete search history.

(56) References Cited

U.S. PATENT DOCUMENTS 6,927,616 B2 * 8/2005 Ho ................. H03K 19/017545
327/292
8,823,420 B2 * 9/2014 Lawson ........... H03K 17/04206
327/108

* cited by examiner

*Primary Examiner* — Hai L Nguyen
(74) *Attorney, Agent, or Firm* — Andrew C. Cheng

(57) ABSTRACT

Disclosed are a transformer circuit and a method of reducing idling power consumption. The transformer circuit comprises a transformer and an auxiliary winding circuit. The transformer comprises a core, a primary winding, a secondary winding and an auxiliary winding. The auxiliary winding circuit is connected to the auxiliary winding. The auxiliary winding circuit comprises a first power supply circuit and a second power supply circuit. The auxiliary winding comprises a first end, a second end and a tap located between the first end and the second end. The present invention can reduce idling power consumption.

11 Claims, 3 Drawing Sheets

Transformer circuit

| turning off the first power supply circuit and the first power supply circuit stopping supplying power to the chip as an output voltage of the second power supply circuit is larger than an output voltage of the first power supply circuit | 401 |

| supplying power to the chip by the auxiliary winding via the second power supply circuit | 402 |

US 10,199,857 B2

TRANSFORMER CIRCUIT AND METHOD OF REDUCING IDLING POWER CONSUMPTION

FIELD OF THE INVENTION

The present invention relates to an electronic technology field, and more particularly to a transformer circuit and a method of reducing idling power consumption.

BACKGROUND OF THE INVENTION

The voltage of the secondary of the transformer tends to change in a larger range to satisfy the demands for the wide voltage output for the current transformer. For the transformers with an auxiliary winding, since the voltage outputted by the auxiliary winding is proportional to the voltage of the secondary winding of the transformer and as the voltage outputted by the transformer is lower, the voltage coupled on the auxiliary winding is also lower and the voltage outputted by the auxiliary winding is lower. Generally, the auxiliary winding supplies power to the chip via the auxiliary winding circuit. The auxiliary winding circuit generally comprises semiconductor components, such as a diode and a triode. As the voltage outputted by the auxiliary winding circuit is lower, the supply voltage of the chip is lower. The larger supply voltage of the chip will cause damage to the chip. Therefore, for avoiding the damage to the chip as the output voltage of the transformer is lower, a voltage stabilization diode is usually added in the auxiliary winding circuit for ensuring that the input voltage of the chip is not lower than the voltage of the voltage stabilization diode (for instance, the voltage stabilization value of the voltage stabilization diode is set to be 15V). However, after the voltage stabilization diode is configured and once the voltage outputted by the secondary winding of the transformer gets high, the voltage outputted by the corresponding auxiliary winding will rise and the input voltage of the auxiliary winding circuit will rise. With the configuration of the voltage stabilization diode, the output voltage of the auxiliary winding circuit is still maintained at the voltage of the voltage stabilization diode. The voltage drop between the input voltage and the output voltage of the auxiliary winding circuit increases. The voltage drop on the component (such as semiconductor components, such as a diode and a triode) in the auxiliary winding circuit will also increase correspondingly to result in the increase of the idling power consumption.

SUMMARY OF THE INVENTION

The present invention discloses a transformer circuit and a method of reducing idling power consumption, which can reduce idling power consumption.

First, the present invention discloses a transformer circuit, comprising a transformer and an auxiliary winding circuit, the transformer comprising a core, a primary winding, a secondary winding and an auxiliary winding, the auxiliary winding circuit connecting to the auxiliary winding, the primary winding, the secondary winding and the auxiliary winding respectively winding the core, the auxiliary winding circuit supplying power to a chip, the auxiliary winding circuit comprising a first power supply circuit and a second power supply circuit, the auxiliary winding comprising a first end, a second end and a tap located between the first end and the second end, wherein the first end of the auxiliary winding is connected to an input end of the first power supply circuit, the tap of the auxiliary winding is connected to an input end of the second power supply circuit, an output end of the first power supply circuit is connected to an output end of the second power supply circuit and a power supply end of the chip, the second end of the auxiliary winding is grounded; an input voltage of the second power supply circuit is smaller than an input voltage of the first power supply circuit; and the first power supply circuit is a voltage stabilizing circuit, the second power supply circuit is a voltage step-down circuit;

as an output voltage of the second power supply circuit is larger than an output voltage of the first power supply circuit, the first power supply circuit is turned off and the auxiliary winding supplies power to the chip via the second power supply circuit; and as an output voltage of the second power supply circuit is smaller than an output voltage of the first power supply circuit, the second power supply circuit is turned off and the auxiliary winding supplies power to the chip via the first power supply circuit.

Second, the present invention discloses a method of reducing idling power consumption, applied to the foregoing transformer circuit, the method comprises steps of:

turning off the first power supply circuit and the first power supply circuit stopping supplying power to the chip as an output voltage of the second power supply circuit is larger than an output voltage of the first power supply circuit; and supplying power to the chip by the auxiliary winding via the second power supply circuit.

The transformer circuit of the present invention comprises a transformer and an auxiliary winding circuit. The transformer comprises a core, a primary winding, a secondary winding and an auxiliary winding. The auxiliary winding circuit supplies power to a chip. The auxiliary winding circuit is connected to the auxiliary winding of the transformer. The auxiliary winding circuit comprises a first power supply circuit and a second power supply circuit. The auxiliary winding comprises a first end, a second end and a tap located between the first end and the second end. The first end of the auxiliary winding is connected to an input end of the first power supply circuit. The tap of the auxiliary winding is connected to an input end of the second power supply circuit. An output end of the first power supply circuit is connected to an output end of the second power supply circuit and a power supply end of the chip. The second end of the auxiliary winding is grounded. An input voltage of the second power supply circuit is smaller than an input voltage of the first power supply circuit. As an output voltage of the second power supply circuit is larger than an output voltage of the first power supply circuit, the first power supply circuit is turned off and the auxiliary winding supplies power to the chip via the second power supply circuit. In the present invention, the input voltage of the first power supply circuit is provided by the voltage between the first end and the second end of the auxiliary winding. Namely, the input voltage of the first power supply circuit is provided by the output voltage of the entire auxiliary winding. The input voltage of the second power supply circuit is provided by the voltage between the tap and the second end of the auxiliary winding. Namely, the input voltage of the second power supply circuit is provided by the output voltage of the partial auxiliary winding. Since the number of turns of the partial auxiliary winding is smaller than the number of turns of the entire auxiliary winding, the input voltage of the second power supply circuit is smaller than the input voltage of the first power supply circuit. As the voltage outputted by the entire auxiliary winding is lower, the power of the chip is provided by the voltage outputted by the first power supply circuit. As the voltage outputted by the entire auxiliary winding gets higher, the first power supply circuit is turned off and stops working. The power of the chip is provided by the voltage outputted by the second power supply circuit. With the implementation of the present invention, the first power supply circuit is turned off in time as the voltage outputted by the entire auxiliary winding gets higher for ensuring that no current flows through the component in the first power supply circuit (such as the triode) and the voltage drop on the component in the first power supply circuit is zero. Thus, the idling power consumption on the component in the first power supply circuit can be reduced.

BRIEF DESCRIPTION OF THE DRAWINGS

In order to more clearly illustrate the embodiments of the present invention, the following figures will be described in the embodiments are briefly introduced. It is obvious that the drawings are only some embodiments of the present invention, those of ordinary skill in this field can obtain other figures according to these figures without paying the premise.

DETAILED DESCRIPTION OF PREFERRED EMBODIMENTS

The embodiment of the present invention will be further described in detail with the accompanying drawings.

The present invention discloses a transformer circuit and a method of reducing idling power consumption, which can reduce the voltage drop on the components of the auxiliary winding and thus to reduce the idling power consumption as the voltage outputted by the auxiliary winding is higher. The detail descriptions are respectively introduced below.

Figure 1:
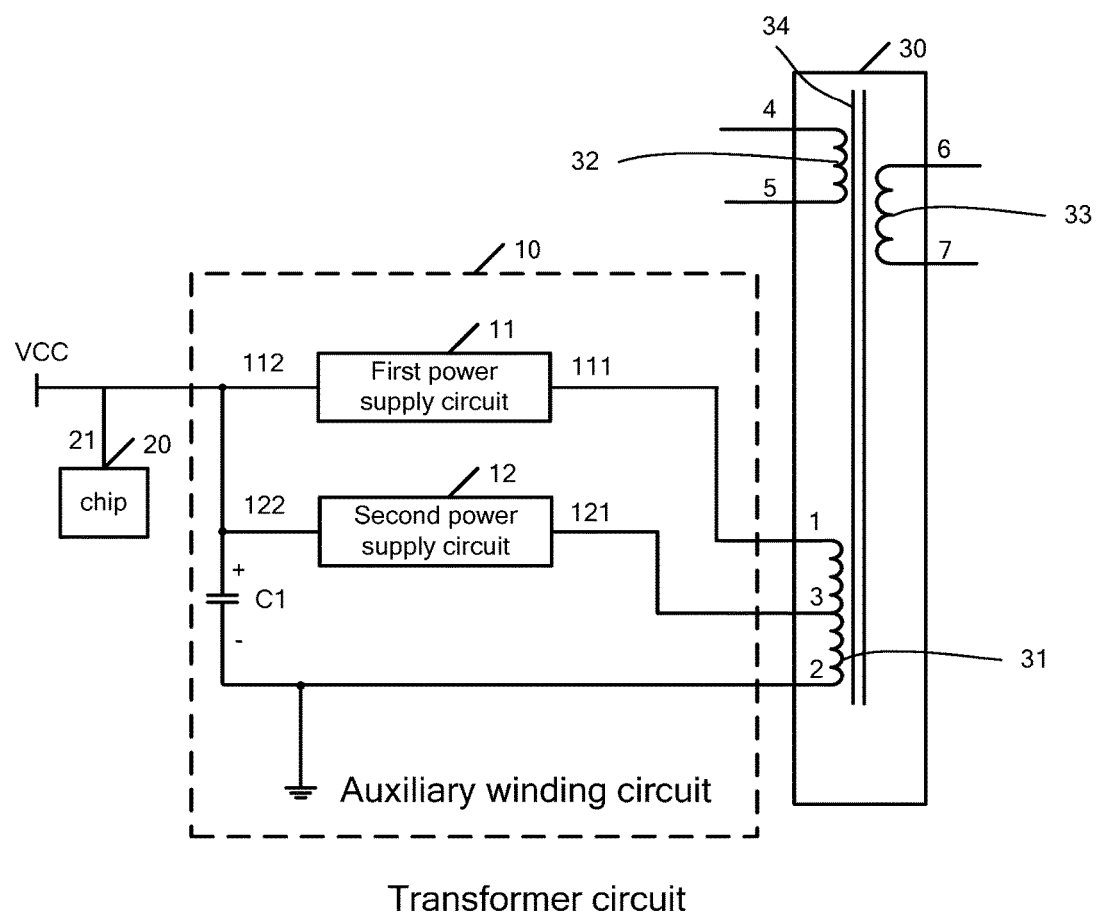
FIG. 1 is a structure diagram of a transformer circuit according to the present invention.

Please refer to FIG. 1. FIG. 1 is a structure diagram of a transformer circuit according to the present invention. As shown in FIG. 1, the transformer circuit comprises a transformer 30 and an auxiliary winding circuit 10. The auxiliary winding circuit 10 supplies power to a chip 20. The transformer 30 comprises a core 34, a primary winding 32, a secondary winding 33 and an auxiliary winding 31. The auxiliary winding circuit 10 is connected to the auxiliary winding 31 of the transformer 30. The auxiliary winding circuit 10 comprises a first power supply circuit 11 and a second power supply circuit 12. The auxiliary winding 31 comprises a first end 1, a second end 2 and a tap 3 located between the first end 1 and the second end 2.

The first end 1 of the auxiliary winding 31 is connected to an input end 111 of the first power supply circuit 11. The tap 3 of the auxiliary winding 31 is connected to an input end 121 of the second power supply circuit 12. An output end 112 of the first power supply circuit 11 is connected to an output end 122 of the second power supply circuit 12 and a power supply end 21 of the chip 20. The second end 2 of the auxiliary winding 31 is grounded. An input voltage of the second power supply circuit 12 is smaller than an input voltage of the first power supply circuit 11. The first power supply circuit 11 is a voltage stabilizing circuit and the second power supply circuit 12 is a voltage step-down circuit.

As an output voltage of the second power supply circuit 12 is larger than an output voltage of the first power supply circuit 11, the first power supply circuit 11 is turned off and the auxiliary winding 31 supplies power to the chip 20 via the second power supply circuit 12. As an output voltage of the second power supply circuit 12 is smaller than an output voltage of the first power supply circuit 11, the second power supply circuit 12 is turned off and the auxiliary winding 31 supplies power to the chip 20 via the first power supply circuit 11.

In the present invention, the input voltage of the first power supply circuit 11 is provided by the first end 1 of the auxiliary winding 31. The input voltage of the second power supply circuit 12 is provided by the tap 3 of the auxiliary winding 31. Apparently, the input voltage of the first power supply circuit 11 is larger than the input voltage of the second power supply circuit 12. Since the first power supply circuit 11 is a voltage stabilizing circuit, regardless of the input voltage of the first power supply circuit 11, the voltage outputted from the first power supply circuit 11 is a fixed voltage value. The first power supply circuit 11 is turned off and the first power supply circuit 11 stops supplying power to the chip 20, then the chip 20 is supplied with power by the second power supply circuit 12 as the output voltage of the second power supply circuit 12 is larger than the fixed voltage value.

As the voltage outputted by the first end 1 of the auxiliary winding 31 is smaller than the fixed voltage value, the voltage outputted by the first power supply circuit 11 is a fixed voltage value. Since the second power supply circuit 12 is a voltage step-down circuit, apparently, the output voltage of the second power supply circuit 12 is smaller than the output voltage of the first power supply circuit 11, then the second power supply circuit 12 is turned off and the auxiliary winding 31 supplies power to the chip 20 via the first power supply circuit 11. As the voltage outputted by the first end 1 of the auxiliary winding 31 is larger than the fixed voltage value and the voltage outputted by the tap 3 of the auxiliary winding 31 is smaller than the fixed voltage value, the output voltage of the second power supply circuit 12 is still smaller than the fixed voltage value. The output voltage of the second power supply circuit 12 is smaller than the output voltage of the first power supply circuit 11, then the second power supply circuit 12 is turned off and the auxiliary winding 31 supplies power to the chip 20 via the first power supply circuit 11. As the voltage outputted by the tap 3 of the auxiliary winding 31 is larger than the fixed voltage value and if the voltage drop on the second power supply circuit 12 is ignored, then the output voltage of the second power supply circuit 12 is larger than the fixed voltage value. Namely, the output voltage of the second power supply circuit 12 is larger than the output voltage of the first power supply circuit 11, then the first power supply circuit 11 is turned off and the auxiliary winding 31 supplies power to the chip 20 via the second power supply circuit 12. Apparently, since the first power supply circuit 11 is turned off and no current flows through the component in the first power supply circuit 11 and the voltage drop on the component in the first power supply circuit 11 is zero. Thus, the idling power consumption on the component in the first power supply circuit 11 can be reduced.

The circuit illustrated in the embodiment of the present invention can ensure that no current flows through the component in the first power supply circuit 11 and the voltage drop on the component in the first power supply circuit 11 is zero, thus, the idling power consumption on the component in the first power supply circuit 11 can be reduced as the voltage outputted by the first end of the auxiliary winding 31 gets high.

Selectably, as shown in FIG. 1, a first capacitor C1 can be connected to the output end of the first power supply circuit 11 and the output end of the second power supply circuit 12. A positive electrode of the first capacitor C1 is connected to the output end of the first power supply circuit 11 and the output end of the second power supply circuit 12. A negative electrode of the first capacitor C1 is grounded. The first capacitor C1 is used for filtering to prevent the voltage fluctuation of the first power supply circuit 11 or the second power supply circuit 12 outputted to the chip 20 to ensure that the voltage output to the chip 20 is stabilized.

With implementing the circuit shown in FIG. 1, the first power supply circuit 11 is turned off and the voltage drop on the component in the first power supply circuit 11 is zero, thus, the idling power consumption on the component in the first power supply circuit 11 can be reduced as the voltage outputted by the first end of the auxiliary winding 31 gets high.

Figure 2:
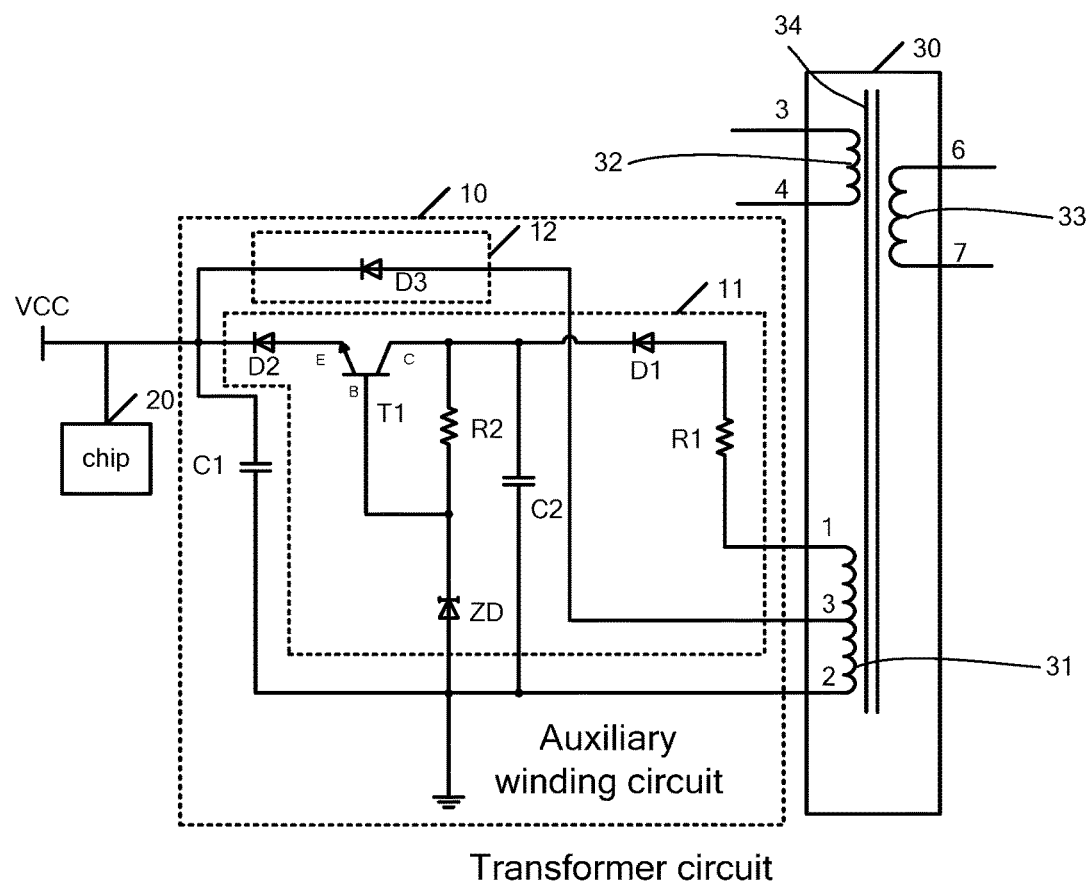
FIG. 2 is a specific structure diagram of another transformer circuit according to the present invention.

Please refer to FIG. 2. FIG. 2 is further refined on the basis of FIG. 1. FIG. 2 is a specific structure diagram of one transformer circuit according to the present invention. As shown in FIG. 2, the transformer circuit comprises a transformer 30 and an auxiliary winding circuit 10. The auxiliary winding circuit 10 supplies power to a chip 20. The transformer 30 comprises a core 34, a primary winding 32, a secondary winding 33 and an auxiliary winding 31. The auxiliary winding circuit 10 is connected to the auxiliary winding 31 of the transformer 30. The auxiliary winding circuit 10 comprises a first power supply circuit 11 and a second power supply circuit 12. The auxiliary winding 31 comprises a first end 1, a second end 2 and a tap 3 located between the first end 1 and the second end 2.

The input end 1 of the auxiliary winding 31 is connected to an input end 111 of the first power supply circuit 11. The tap 3 of the auxiliary winding 31 is connected to an input end 121 of the second power supply circuit 12. An output end 112 of the first power supply circuit 11 is connected to an output end 122 of the second power supply circuit 12 and a power supply end 21 of the chip 20. The second end 2 of the auxiliary winding 31 is grounded. An input voltage of the second power supply circuit 12 is smaller than an input voltage of the first power supply circuit 11.

As an output voltage of the second power supply circuit 12 is larger than an output voltage of the first power supply circuit 11, the first power supply circuit 11 is turned off and the auxiliary winding 31 supplies power to the chip 20 via the second power supply circuit 12.

Selectably, as shown in FIG. 2, a first capacitor C1 can be connected to the output end of the first power supply circuit 11 and the output end of the second power supply circuit 12. A positive electrode of the first capacitor C1 is connected to the output end of the first power supply circuit 11 and the output end of the second power supply circuit 12. A negative electrode of the first capacitor C1 is grounded. The first capacitor C1 is used for filtering.

Selectably, as shown in FIG. 2, the first power supply circuit 11 comprises a first resistor R1, a first diode D1, a first triode T1, a second diode D2, a second resistor R2, a stabilivolt ZD and a second capacitor C2, wherein the first triode T1 is an NPN transistor, a first end of the first resistor R1 is connected to the first end 1 of the auxiliary winding 31, a second end of the first resistor R1 is connected to the positive electrode of the first diode D1, a negative electrode of the first diode D1 is connected to a collector of the first triode T1, a first end of the second resistor R2 and a positive electrode of the second capacitor C2, an emitter of the first triode T1 is connected to a positive electrode of the second diode D2, a negative electrode of the second diode D2 is connected to the power supply end of the chip 20, a base of the first triode T1 is connected to a second end of the second resistor R2 and a negative electrode of the stabilivolt ZD, a positive electrode of the stabilivolt ZD, a negative electrode of the stabilivolt ZD and a negative electrode of the second capacitor C2 are grounded.

Selectably, as shown in FIG. 2, the second power supply circuit 12 comprises a third diode D3, a positive electrode of the third diode D3 is connected to the tap 3 of the auxiliary winding 31, a negative electrode of the third diode D3 is connected to a negative electrode of the second diode D2.

In the present invention, if the voltage stabilization value of the stabilivolt ZD is set to be 15V and the total voltage drop on the first triode T1 and the second diode D2 is 1V, the voltage outputted by the first power supply circuit 11 to the chip 20 is 14V. As the voltage outputted by the first end 1 of the auxiliary winding 31 is lower (for instance, lower than 14V), the auxiliary winding 31 supplies power to the chip 20 via the first power supply circuit 11 to ensure that the supply voltage of the chip 20 is maintained about 14V. Then, the voltage of the output end of the second power supply circuit 12 is also maintained about 14V. Since the voltage of the input end of the second power supply circuit 12 is provided by the tap 3 of the auxiliary winding 31 (at this point, the voltage of the tap 3 is obviously smaller than 14V), the positive electrode voltage of the third diode D3 is smaller than the negative electrode voltage thereof. The third diode D3 is turned off, thus, the second power supply circuit 12 is turned off.

It is assumed that the voltage drop of the third diode D3 is 0.7V and the total voltage drop on the first triode T1 and the second diode D2 is 1V, the voltage stabilization value of the stabilivolt ZD is 15V. As the voltage outputted by the tap 3 of the auxiliary winding 31 is lower than 14.7V, since the voltage outputted by the first power supply circuit 11 to the chip 20 is maintained at 14V, the third diode D3 cannot be turned on, the second power supply circuit 12 is turned off, the supply voltage of the chip 20 is provided by the first power supply circuit 11. As the voltage outputted by the tap 3 of the auxiliary winding 31 is larger than 14.7V, the voltage outputted by the second power supply circuit 12 is larger than 14V. Since the voltage outputted by the first power supply circuit 11 to the chip 20 is still maintained at 14V, the voltage drop on the first triode T1 and the second diode D2 in the first power supply circuit 11 is smaller than 1V. The first triode T1 and the second diode D2 cannot be turned on. The first power supply circuit 11 is turned off and the supply voltage of the chip 20 is provided by the second power supply circuit 12. Then, no current flows through the component in the first power supply circuit 11 and the voltage drop on the component in the first power supply circuit 11 is zero. Thus, the idling power consumption on the component in the first power supply circuit 11 can be reduced.

With implementing the circuit shown in FIG. 2, the first power supply circuit 11 is turned off and the voltage drop on first triode T1 in the first power supply circuit 11 is zero, thus, the idling power consumption on the component in the first power supply circuit 11 can be reduced as the voltage outputted by the first end 1 of the auxiliary winding 31 is higher.

Figures 3, 4:
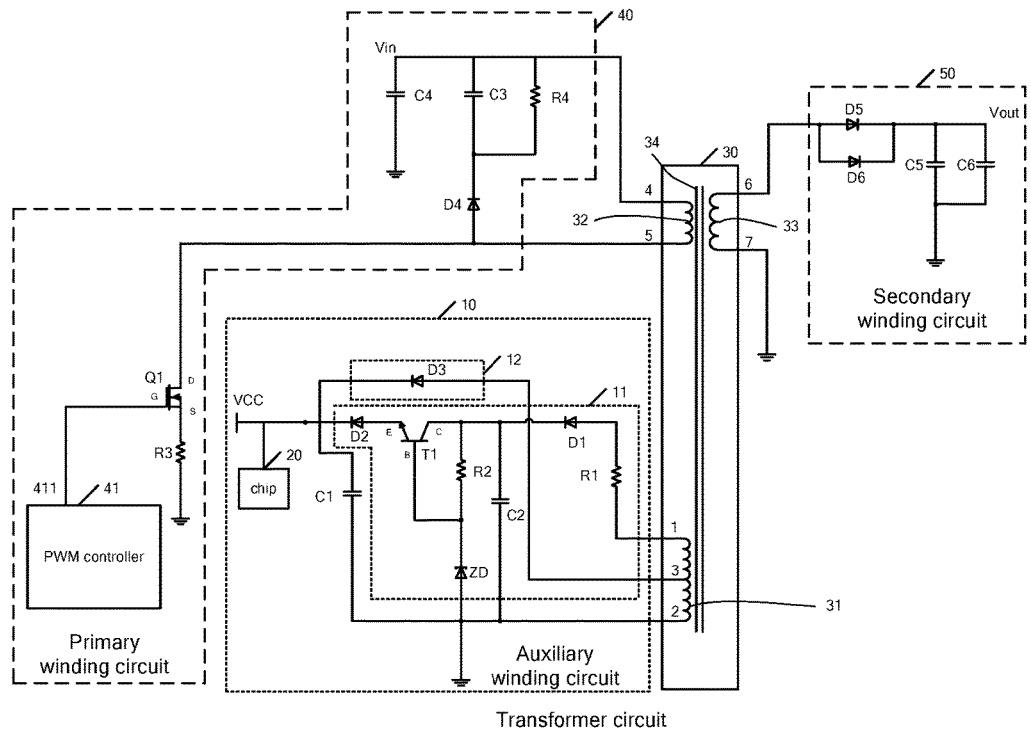
FIG. 3 is a structure diagram of another transformer circuit according to the present invention.
FIG. 4 is a flowchart of a method of reducing idling power consumption according to the present invention.

Please refer to FIG. 3. FIG. 3 is a structure diagram of another transformer circuit according to the present invention. As shown in FIG. 3, the transformer circuit comprises a transformer 30, an auxiliary winding circuit 10, a primary winding circuit 40 and a secondary winding circuit 50. The transformer 30 comprises a core 34, a primary winding 32, a secondary winding 33 and an auxiliary winding 31. The primary winding circuit 40 is connected to the primary winding 32. The secondary winding circuit 50 is connected to the secondary winding 33. The auxiliary winding circuit 10 is connected to the auxiliary winding 31. The primary winding 32, the secondary winding 33 and the auxiliary winding 31 respectively wind the core 34. The auxiliary winding 31 comprises a first end 1, a second end 2 and a tap 3 located between the first end 1 and the second end 2.

Selectably, as shown in FIG. 3, the primary winding circuit 40 comprises a pulse width modulation (PWM) controller 41, a metal oxide semiconductor (MOS) transistor Q1, a third resistor R3, a fourth diode D2, a third capacitor C3, a fourth capacitor C4 and a fourth resistor R4, wherein a first end 4 of the primary winding 32 is connected to a positive electrode of the third capacitor C3, a positive electrode of the fourth capacitor C4 and a first end of the fourth resistor R4, a negative electrode of the fourth capacitor C4 is grounded, a negative electrode of the third capacitor C3 and a second end of the fourth resistor R4 are connected to a negative electrode of the fourth diode D4, a positive electrode of the fourth diode D4 is connected to a second end 5 of the primary winding 32 and a drain of the metal oxide semiconductor transistor Q1, a source of the metal oxide semiconductor transistor Q1 is connected to a first end of the third resistor R3, a second end of the third resistor R3 is grounded, a gate of the metal oxide semiconductor transistor Q1 is connected to a control end 411 of the pulse width modulation controller 41.

Selectably, as shown in FIG. 3, the secondary winding circuit 50 comprises a fifth diode D5, a sixth diode D6, a fifth capacitor C5 and a sixth capacitor C6, wherein a first end 6 of the secondary winding 33 is connected to a positive electrode of the fifth diode D5 and a positive electrode of the sixth diode D6, a negative electrode of the fifth diode D5 and a negative electrode of the sixth diode D6 are connected to a positive electrode of the fifth capacitor C5 and a positive electrode of the sixth capacitor C6, a negative electrode of the fifth capacitor C5 and a negative electrode of the sixth capacitor C6 are grounded, a second end 7 of the secondary winding 33 is grounded.

The transformer circuit of the present invention can control the voltage inputted by the primary winding of the transformer with the wave duty ratio of the pulse width modulation signal outputted by the pulse width modulation controller 41, thus can control the voltage outputted by the secondary winding of the transformer and the voltage outputted by the auxiliary winding.

Please refer to FIG. 4. FIG. 4 is a flowchart of a method of reducing idling power consumption according to the present invention. The method is applied to the transformer circuits shown in FIG. 1 to FIG. 3. The method of reducing idling power consumption comprises following steps.

Step 401, turning off the first power supply circuit and the first power supply circuit stopping supplying power to the chip as an output voltage of the second power supply circuit is larger than an output voltage of the first power supply circuit.

Step 402, supplying power to the chip by the auxiliary winding via the second power supply circuit.

Selectably, Step 401 can comprise a step of: turning off a first triode in the first power supply circuit and the first power supply circuit stopping supplying power to the chip as an output voltage of the second power supply circuit is larger than an output voltage of the first power supply circuit as the output voltage of the second power supply circuit is larger than the output voltage of the first power supply circuit.

Selectably, Step 402 can comprise a step of: the second power supply circuit inputting a voltage via the tap of the auxiliary winding and outputting the voltage inputted from the tap to the chip via a diode in the second power supply circuit after the first power supply circuit stops supplying power to the chip.

While implementing the method shown in FIG. 4, as the output voltage of the second power supply circuit is larger than the output voltage of the first power supply circuit, the first power supply circuit is turned off and the first power supply circuit stops supplying power to the chip. The auxiliary winding supplies power to the chip via the third diode. Accordingly, as the voltage outputted by the entire auxiliary winding gets high, it can be ensured that no current flows through the component in the first power supply circuit and the voltage drop on the component in the first power supply circuit is zero. Thus, the idling power consumption on the component in the first power supply circuit can be reduced.

The foregoing descriptions are merely the specific embodiments of the present invention. However, the present invention is not limited thereby. Any modifications, equivalent replacements or improvements within the spirit and principles of the embodiment described above, which can be easily derived by those skilled persons in this art from the technical field disclosed in the present invention should be covered by the protected scope of the invention. Thus, the patent protection scope of the present application should be subjected to what is claimed is.

What is claimed is:

1. A transformer circuit, comprising a transformer and an auxiliary winding circuit, the transformer comprising a core, a primary winding, a secondary winding and an auxiliary winding, the auxiliary winding circuit connecting to the auxiliary winding, the primary winding, the secondary winding and the auxiliary winding respectively winding the core, the auxiliary winding circuit supplying power to a chip, the auxiliary winding circuit comprising a first power supply circuit and a second power supply circuit, the auxiliary winding comprising a first end, a second end and a tap located between the first end and the second end, wherein the first end of the auxiliary winding is connected to an input end of the first power supply circuit, the tap of the auxiliary winding is connected to an input end of the second power supply circuit, an output end of the first power supply circuit is connected to an output end of the second power supply circuit and a power supply end of the chip, the second end of the auxiliary winding is grounded; an input voltage of the second power supply circuit is smaller than an input voltage of the first power supply circuit; and the first power supply circuit is a voltage stabilizing circuit, the second power supply circuit is a voltage step-down circuit;

wherein as an output voltage of the second power supply circuit is larger than an output voltage of the first power supply circuit, the first power supply circuit is turned off and the auxiliary winding supplies power to the chip via the second power supply circuit; and as an output voltage of the second power supply circuit is smaller than an output voltage of the first power supply circuit, the second power supply circuit is turned off and the auxiliary winding supplies power to the chip via the first power supply circuit.

2. The transformer circuit according to claim 1, wherein the first power supply circuit comprises a first resistor, a first diode, a first triode, a second diode, a second resistor, a stabilivolt and a second capacitor, wherein a first end of the first resistor is connected to the first end of the auxiliary winding, a second end of the first resistor is connected to a positive electrode of the first diode, a negative electrode of the first diode is connected to a collector of the first triode, a first end of the second resistor and a positive electrode of the second capacitor, an emitter of the first triode is connected to a positive electrode of the second diode, a negative electrode of the second diode is connected to the power supply end of the chip, a base of the first triode is connected to a second end of the second resistor and a negative electrode of the stabilivolt, a positive electrode of the stabilivolt, a negative electrode of the stabilivolt and a negative electrode of the second capacitor are grounded.

3. The transformer circuit according to claim 1, wherein the second power supply circuit comprises a third diode, a positive electrode of the third diode is connected to the tap of the auxiliary winding, a negative electrode of the third diode is connected to the power supply end of the chip.

4. The transformer circuit according to claim 2, wherein the second power supply circuit comprises a third diode, a positive electrode of the third diode is connected to the tap of the auxiliary winding, a negative electrode of the third diode is connected to the power supply end of the chip.

5. The transformer circuit according to claim 1, wherein the transformer circuit further comprises a primary winding circuit and a secondary winding circuit, the primary winding circuit is connected to the primary winding and the secondary winding circuit is connected to the secondary winding, wherein the primary winding circuit comprises a pulse width modulation (PWM) controller, a metal oxide semiconductor transistor, a third resistor, a fourth diode, a third capacitor, a fourth capacitor and a fourth resistor, wherein a first end of the primary winding is connected to a positive electrode of the third capacitor, a positive electrode of the fourth capacitor and a first end of the fourth resistor, a negative electrode of the fourth capacitor is grounded, a negative electrode of the third capacitor and a second end of the fourth resistor are connected to a negative electrode of the fourth diode, a positive electrode of the fourth diode is connected to a second end of the primary winding and a drain of the metal oxide semiconductor transistor, a source of the metal oxide semiconductor transistor is grounded via the third resistor, a gate of the metal oxide semiconductor transistor is connected to a control end of the pulse width modulation controller.

6. The transformer circuit according to claim 2, wherein the transformer circuit further comprises a primary winding circuit and a secondary winding circuit, the primary winding circuit is connected to the primary winding and the secondary winding circuit is connected to the secondary winding, wherein the primary winding circuit comprises a pulse width modulation (PWM) controller, a metal oxide semiconductor transistor, a third resistor, a fourth diode, a third capacitor, a fourth capacitor and a fourth resistor, wherein a first end of the primary winding is connected to a positive electrode of the third capacitor, a positive electrode of the fourth capacitor and a first end of the fourth resistor, a negative electrode of the fourth capacitor is grounded, a negative electrode of the third capacitor and a second end of the fourth resistor are connected to a negative electrode of the fourth diode, a positive electrode of the fourth diode is connected to a second end of the primary winding and a drain of the metal oxide semiconductor transistor, a source of the metal oxide semiconductor transistor is grounded via the third resistor, a gate of the metal oxide semiconductor transistor is connected to a control end of the pulse width modulation controller.

7. The transformer circuit according to claim 5, wherein the secondary winding circuit comprises a fifth diode, a sixth diode, a fifth capacitor and a sixth capacitor, wherein a first end of the secondary winding is connected to a positive electrode of the fifth diode and a positive electrode of the sixth diode, a negative electrode of the fifth diode and a negative electrode of the sixth diode are connected to a positive electrode of the fifth capacitor and a positive electrode of the sixth capacitor, a negative electrode of the fifth capacitor and a negative electrode of the sixth capacitor are grounded, a second end of the secondary winding is grounded.

8. The transformer circuit according to claim 6, wherein the secondary winding circuit comprises a fifth diode, a sixth diode, a fifth capacitor and a sixth capacitor, wherein a first end of the secondary winding is connected to a positive electrode of the fifth diode and a positive electrode of the sixth diode, a negative electrode of the fifth diode and a negative electrode of the sixth diode are connected to a positive electrode of the fifth capacitor and a positive electrode of the sixth capacitor, a negative electrode of the fifth capacitor and a negative electrode of the sixth capacitor are grounded, a second end of the secondary winding is grounded.

9. The transformer circuit according to claim 1, wherein the transformer circuit further comprises a first capacitor, a positive electrode of the first capacitor is connected to the output end of the first power supply circuit, a negative electrode of the first capacitor is grounded.

10. A method of reducing idling power consumption, applied to the transformer circuit according to claim 1, wherein the method comprises steps of:
turning off the first power supply circuit and the first power supply circuit stopping supplying power to the chip as an output voltage of the second power supply circuit is larger than an output voltage of the first power supply circuit; and
supplying power to the chip by the auxiliary winding via the second power supply circuit.

11. The method according to claim 10, wherein the step of turning off the first power supply circuit and the first power supply circuit stopping supplying power to the chip as an output voltage of the second power supply circuit is larger than an output voltage of the first power supply circuit as the output voltage of the second power supply circuit is larger than the output voltage of the first power supply circuit is:
turning off a first triode in the first power supply circuit and the first power supply circuit stopping supplying power to the chip as an output voltage of the second power supply circuit is larger than an output voltage of the first power supply circuit as the output voltage of the second power supply circuit is larger than the output voltage of the first power supply circuit; and
the step of supplying power to the chip by the auxiliary winding via the second power supply circuit is: the second power supply circuit inputting a voltage via the tap of the auxiliary winding and outputting the voltage inputted from the tap to the chip via a diode in the second power supply circuit after the first power supply circuit stops supplying power to the chip.

* * * * *